(12) United States Patent
Vanderpool

(10) Patent No.: US 9,021,485 B2
(45) Date of Patent: Apr. 28, 2015

(54) AUTOMATICALLY RESTARTING A FIRST CHILD PROCESS BASED ON PRESENCE OF SQL CODE IN A LIST

(75) Inventor: Trey Vanderpool, Bentonville, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 644 days.

(21) Appl. No.: 12/544,784

(22) Filed: Aug. 20, 2009

(65) Prior Publication Data
US 2010/0050176 A1 Feb. 25, 2010

Related U.S. Application Data

(60) Provisional application No. 61/090,534, filed on Aug. 20, 2008.

(51) Int. Cl.
G06F 9/46 (2006.01)
G06F 11/14 (2006.01)

(52) U.S. Cl.
CPC ........ *G06F 11/1438* (2013.01); *G06F 11/1474* (2013.01); *G06F 11/1482* (2013.01)

(58) Field of Classification Search
None
See application file for complete search history.

(56) References Cited

U.S. PATENT DOCUMENTS

| 4,648,031 | A | 3/1987 | Jenner |
| 5,914,874 | A | 6/1999 | Nohara |
| 6,154,847 | A | 11/2000 | Schofield et al. |
| 7,076,480 | B2 * | 7/2006 | Scardo et al. ......................... 1/1 |
| 7,650,602 | B2 * | 1/2010 | Amamiya et al. ............. 718/104 |
| 2002/0174108 | A1 * | 11/2002 | Cotner et al. ..................... 707/3 |
| 2002/0184295 | A1 | 12/2002 | Bartley |
| 2004/0172632 | A1 | 9/2004 | Smith et al. |
| 2009/0094582 | A1 * | 4/2009 | Craft et al. .................... 717/127 |

OTHER PUBLICATIONS

International Search Report and Written Opinion for related PCT Application No. PCT/US2009/054483 dated Apr. 20, 2010.

* cited by examiner

*Primary Examiner* — Meng An
*Assistant Examiner* — Wissam Rashid
(74) *Attorney, Agent, or Firm* — McCarter & English, LLP; David R. Burns

(57) ABSTRACT

Systems and methods for auto-restarting abnormally terminated processes are disclosed. An auto-restart system can include a parent task control block, a child process, and a shared resource. The parent task control block can spawn the child process. The child process can operate on the shared resource. When the child process finds the shared resource locked, the child process can terminate abnormally. The parent task control block can recognize the abnormal termination of the child process, and can automatically rollback and restart the child process. Accordingly, the child process can be restarted to operate on the shared resource without human intervention.

22 Claims, 6 Drawing Sheets

AUTOMATICALLY RESTARTING A FIRST CHILD PROCESS BASED ON PRESENCE OF SQL CODE IN A LIST

CROSS-REFERENCE TO RELATED APPLICATION & PRIORITY CLAIM

This application claims the benefit, under 35 U.S.C. §119 (e), of U.S. Provisional Application Ser. No. 61/090,534, filed 20 Aug. 2008, the entire contents and substance of which is hereby incorporated by reference.

TECHNICAL FIELD

Various embodiments of the present invention relate generally to computer process management, and more particularly, to systems and methods for auto-restarting processes in a database environment or other environment having shared resources.

BACKGROUND

In a database system, multiple jobs, or processes typically run simultaneously. A database likely contains many records, and processes operating on the database may require access to the records. There may also be instances in which multiple processes require access to a single record. Some forms of access to records, such as basic read operations, do not require an acting process to lock the record on which it is operating. Other forms of access, however, such as typical write operations, may require a process to exclude other processes from performing operations on the accessed record. The database system may implement a locking mechanism to enable processes to lock a shared resource while certain operations are performed on the locked resource.

While locking can be beneficial in computing environments where multiple processes run simultaneously on a set of resources, locking may sometimes lead to inefficiencies. For example, a first process may be required to wait for a second process to complete a task on a locked shared resource. While waiting, the first process may repeatedly check the availability of the shared resource until the shared resource becomes available again. As a result, processor power is used inefficiently to ensure that the second process can proceed as soon as possible.

A database system may be constructed such that, if a process waits too long for a particular resource, that process is automatically terminated. This termination can conserve computing power by reducing the repetitive checking that occurs while the process waits for the shared resource. As an unfortunate result, when the desired resource is available, the ceased process is no longer running, although it could conceivably access the resource. In conventional database systems, a database administrator may be required to manually restart the terminated process, so that the process can continue its tasks.

Manually restarting processes, however, can lead to some undesirable results. For example, manual restart allows for human error in restarting a process. Additionally, manual restart will likely not occur immediately after the desired resource becomes available and, as a result, the system is not as efficient as desired.

Accordingly, there is a need for systems and methods for sensing when a process has ended, and for automatically restarting such process. It is such systems and methods to which various embodiments of the present invention are directed.

SUMMARY

Briefly described, various embodiments of the present invention generally comprise auto-restart systems, methods, and utilities for detecting abnormal termination of processes, and restarting terminated processes. Embodiments of the present invention can be implemented in database systems or many computing environments where multiple processes run concurrently while operating on one or more shared resources.

According to an exemplary embodiment of the present invention, an auto-restart system can comprise one or more shared resources, a plurality of task control blocks, and a plurality of child processes.

The shared resources can be database records or other forms of data in a computing system. The shared resources are shared among the child processes, in that multiple child processes can concurrently attempt to access the shared resources.

Each task control block, or parent process, can perform a process call to start a child process. After calling the child process, the task control block can remain in a hung state until the child process terminates. When the child process terminates, the task control block can receive an exit code output by the child process when the child terminated. As a result, the task control block can detect when its child process terminates, and with what exit code the child process terminates. The task control block can determine whether, when, and under what conditions to restart the child process. Without human intervention, the task control block can restart a terminated child processes automatically.

The child processes can be spawned by the task control blocks, and can be configured to operate on the shared resources. In some instances, a first child process will lock a shared resource while performing an operation on the resource. In that case, if a second child process attempts to access the same shared resource in a manner that is prevented by the lock, the second child process can be unsuccessful in accessing the shared resource. The second child process may be terminated after a predetermined period of time, or after some other condition is met, while the second process unsuccessfully attempts to access the shared resource.

The task control block that spawned the second child process can sense termination of the second child process and, if appropriate, can restart the second child process.

These and other objects, features, and advantages of the auto-restart systems and methods will become more apparent upon reading the following specification in conjunction with the accompanying drawing figures.

DETAILED DESCRIPTION

Figure 1:
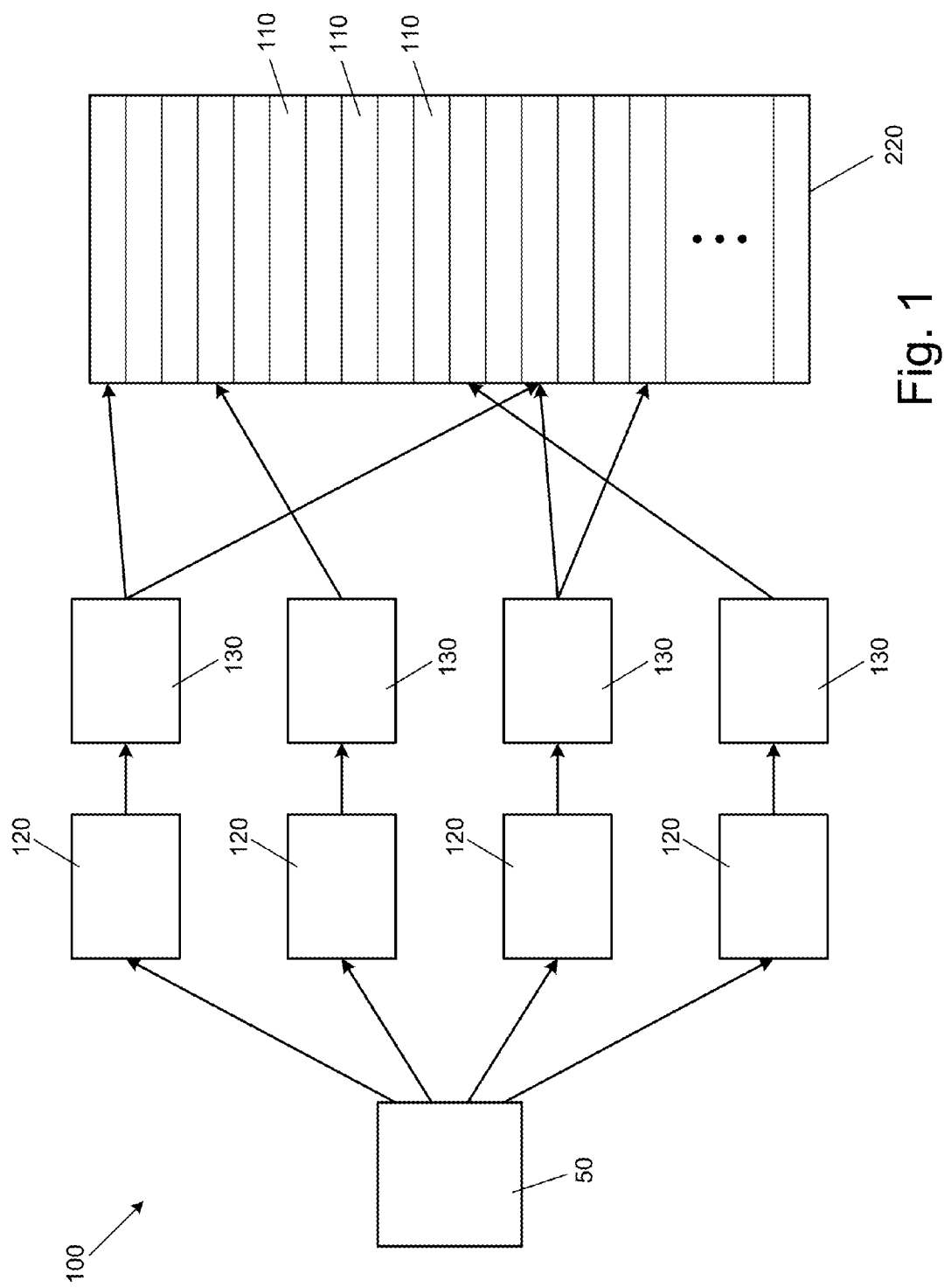
FIG. 1 illustrates a block diagram of an auto-restart system, according to an exemplary embodiment of the present invention.

Various embodiments of the invention are auto-restart systems and methods. To facilitate an understanding of the principles and features of the auto-restart systems and methods, various illustrative embodiments are explained below. In particular, the invention is described in the context of being an auto-restart utility for restarting database processes that terminate abnormally. Embodiments of the invention, however, are not limited to database contexts, but can be used in many systems providing shared resources or a plurality of processes.

The components described hereinafter as making up various elements of the auto-restart systems and methods are intended to be illustrative and not restrictive. Many suitable components that would perform the same or similar functions as the components described herein are intended to be embraced within the scope of the invention. Such other components not described herein can include, but are not limited to, for example, components developed after development of the invention.

Referring now to the figures, wherein like reference numerals represent like parts throughout the views, embodiments of the auto-restart systems and methods will be described in detail.

FIG. 1 illustrates a block diagram of an auto-restart system according to an exemplary embodiment of the present invention. As shown in FIG. 1, the auto-restart system can comprise a processor 50, one or more shared resources 110, a plurality of task control blocks 120, and a plurality of child processes 130. These elements of the auto-restart system 100 will be described further below.

The below discussion, while provided in various sections, should be read as a whole, and as applying to this entire disclosure and the various embodiments of the auto-restart system 100. Thus, discussion of one or more features and embodiments in a particular section can also be pertinent to other features and embodiments discussed in one or more other sections.

Database Management Systems

Figure 2:
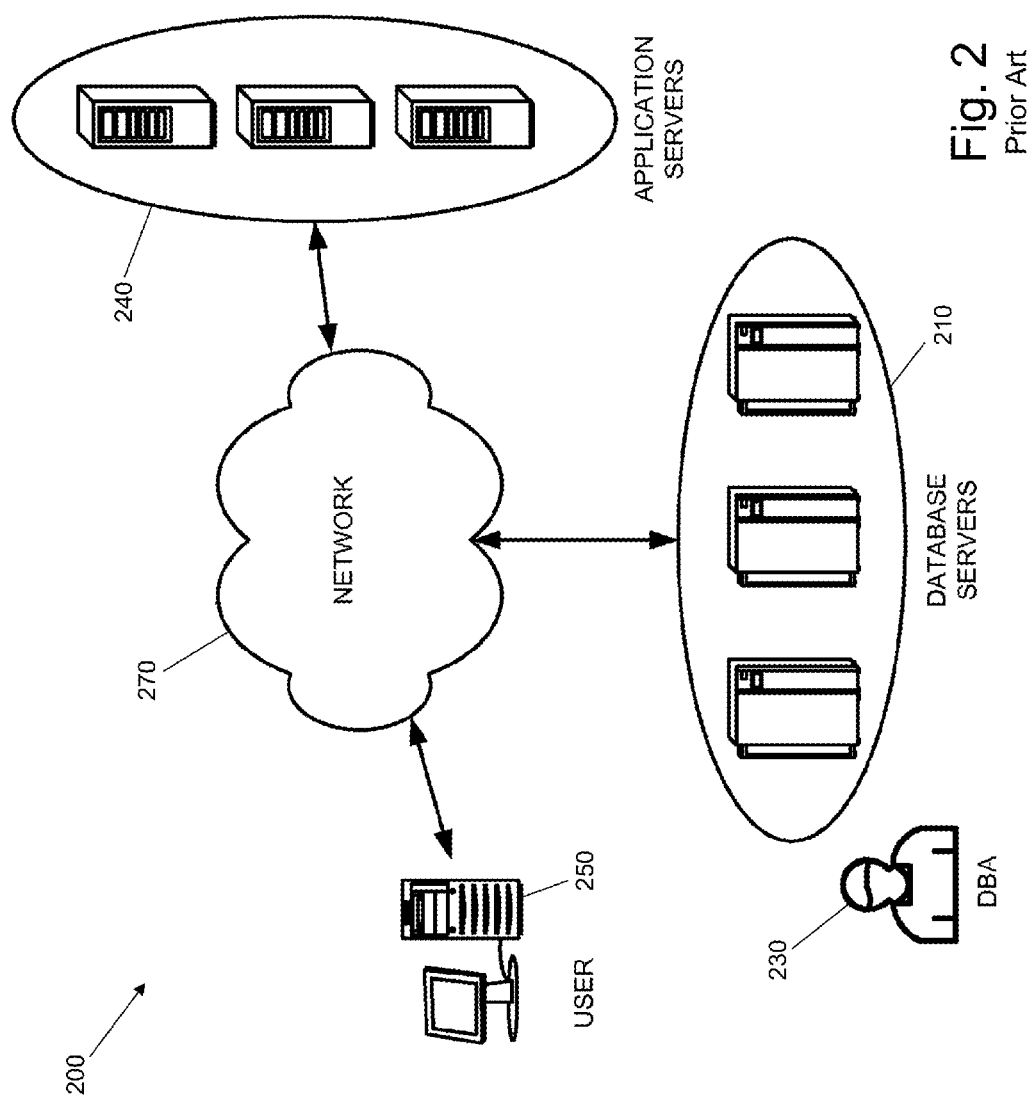
FIG. 2 illustrates a conventional database management system.

Various aspects of the auto-restart system 100 can be elements of, or can interact with, a database management system 200. FIG. 2 illustrates a conventional database management system, which can provide a basis for the auto-restart system 100. As shown in FIG. 2, the database management system 200 can comprise at least one database server 210, a database 220 (see FIG. 1), a database administrator 230, and at least one application server 240. The database management system 200 can be accessible by remote computing devices 250 via a network 270.

The database server 210 can maintain the database 220 on one or more storage devices. The storage devices can be of various types, including, without limitation, magnetic, optical, and magneto-optical storage devices, or flash memory. The database 220 can include a plurality of database records, which can act as the shared resources 110 in the auto-restart system 100.

The database administrator 230 can be responsible for operation and maintenance of the database server 210, the database 220, and the application server 240.

In a typical scenario, a database client, such as the remote computing device 250, can allow a user to enter data through a user interface, such as a web browser. This data can be sent to the application server 240 across the network 270. Base on the data received from the database client 250, the application server 230 can form a database query, such as a SQL query. The application server 230 can then forward the query to the database server 210, directly or across the network 270. In some database management systems 200, the application server 240 can be integrated into the database server 210. After receiving the query, the database server 210 can validate the query and, if valid, perform the operations required by the query.

The database server 210 can normally, but need not, be programmed to accommodate multiple database clients 250, which can concurrently connect to the database server 210 with different requests. These requests can include, for example, routine online transaction processing ("OLTP") requests, in which relatively few database records need to be processed with sub-second response times. In some instances, the database clients 250 can also issue processor-intensive decision support system ("DSS") requests, which may require hours to complete.

To support queries, the database server 210 can implement a set of database server processes. These can include, without limitation, various transaction management, scheduling and data management functions, query optimization, scan processing, join processing, aggregation processing, sort processing, convergence processing, final result set processing, logging, recovery, index management, concurrency control, buffer pool management, and parallel query processing. To efficiently perform these or other processes of the database management system 100, the database server 210 can often run multiple processes simultaneously. Some or all of the running processes can be required to operate on the database records 110 concurrently. Because database records are shared between the processes, there can be instances in which multiple processes seek simultaneous access to a single database record 110.

Database systems 200 conventionally implement one or more methods for avoiding data corruption that can occur as a result of maintaining shared resources 110, such as database records. A conventional database can implement locking, in which a process can lock a shared resource 110 when performing certain types of data accesses, such as write operations. When a first process locks a shared resource 110, such as a database record, a second process can be unable to access the shared resource 110 for the purpose of certain operations, such as additional write operations. As a result, the database management system 200 can avoid corruption that can occur when multiple processes attempt to write to the same shared resource 110.

A database process encounters a database contention error when that process cannot proceed because a shared resource 110 that it must access is locked. A negative result of locking is that, when a database contention error occurs, a process may be required to wait for its turn to access the shared resource 110. While waiting, the process can repeatedly check whether the shared resource 110 is available. This repeated checking can inefficiently utilize other system resources, such a processor power.

Some conventional database systems 200 seek to conserve processor power by terminating database processes that cannot proceed because of a database contention error. Once terminated, a waiting process can no longer waste process power, but the process is also unable to complete its assigned tasks. In a conventional database management system 200, a database administrator 230 must manually select which processes to restart and, if applicable, must rollback each of such processes to a checkpoint from which they should proceed. This manual intervention can lead to undesirable manual errors. Additionally, because a process remains terminated until a human intervenes, a process that might otherwise be able to proceed cannot do so until manually restarted. As a result, such a process is delayed until human intervention occurs.

Exemplary Aspects of Auto-Restart Systems and Methods

Various embodiments of the present invention can reduce wasteful processor usage, while enabling processes to proceed in their tasks without human intervention. Referring back to FIG. 1, as mentioned above, an exemplary embodiment of the auto-restart system 100 can comprise a processor 50, one or more shared resources 110, a plurality of task control blocks 120, and a plurality of child processes 130.

Operations of the auto-restart system 100 and its components can be performed by, or in, a computer system. Accordingly, such operations can be stored on a computer-readable medium of expression and performed by a computer processor, such as the processor depicted in FIG. 1. Further, various modules and components associated with the auto-restart system 100 can be implemented as hardware, software, or a combination thereof.

The one or more shared resources 110 can be records in the database 220 or other forms of data in a computing system. The shared resources 110 can be shared among the child processes 130, such that multiple child processes 130 can simultaneously attempt to access the shared resources 110.

The processor 50 can initialize the plurality of task control blocks 120, and can execute one or more processes for operation of the task control blocks 120.

Each task control block 120, or parent process, can perform a process call to initialize a child process 130 for running a program of the database management system 100. After initiating a child process, the task control block 120 can remain in a hung state until its child process terminates. Alternatively, in a multi-threaded implementation of the auto-restart system, the task control block 120 can spawn multiple child processes 130, and can monitor each of its child processes 130 to detect termination. Regardless of whether a multi-threaded implementation is used, when the child process 130 terminates, the task control block 120 can receive an exit code output by the child process 130 upon termination. Accordingly, the task control block 120 can detect this termination.

The child processes 130 can represent various programs operating within the database management system 100. Each of the plurality of child processes 130 can be spawned by a task control block 120. When a task control block 120 calls a program, the called program can become a child process 130 of the auto-restart system 100. The child process 130 can be configured to execute a sequence of tasks of the called program, and some of these tasks may require access to the shared resources 110. While each child process 130 executes its assigned tasks, a checkpoint utility can create one or more checkpoints of the child process 130. The checkpoints can be snapshots of the current state of the child process 130, and can include SQL codes and current values of variables. The checkpoints can be used to the return the child process 130 to a point before abnormal termination of the child process 130.

In some instances, a first child process 130 can lock a shared resource 110 before performing an operation on the resource 110. In that case, if a second child process 130 attempts to access the same shared resource 110 in a manner that is prevented by the lock, the second child process 130 can encounter a database contention error. If the database contention error remains unresolved after a predetermined number, or timeframe, of unsuccessful attempts to access the shared resource 110, the second child process 130 can be terminated. In that case, the child process 130 can terminate itself or, alternatively, the task control block 120 running the child process 130 can terminate the child process 130.

When a child process 130 terminates, the child process 130 can output an exit code. The corresponding task control block 120 can receive the exit code output by the child process 130 upon termination. As a result, a task control block 120 can detect when a child process 130 terminates, and with what exit code the child process 130 terminates. The task control block 120 can also detect the SQL codes that were being run by the child process 130 before the child process 130 terminated. Based, at least partially, on the exit code and the last SQL code of the terminated child process 130, the task control block 120 can determine whether, when, and how to restart the child process 130. For example, if a child process 130 exits with a GOBACK code, the task control block 130 can rollback the child process 130 before restarting the child process 130. Additionally, the last SQL code of a child process 130 can be further utilized by the task control block 130 to determine how long to wait before restarting the child process 130.

Figure 3:
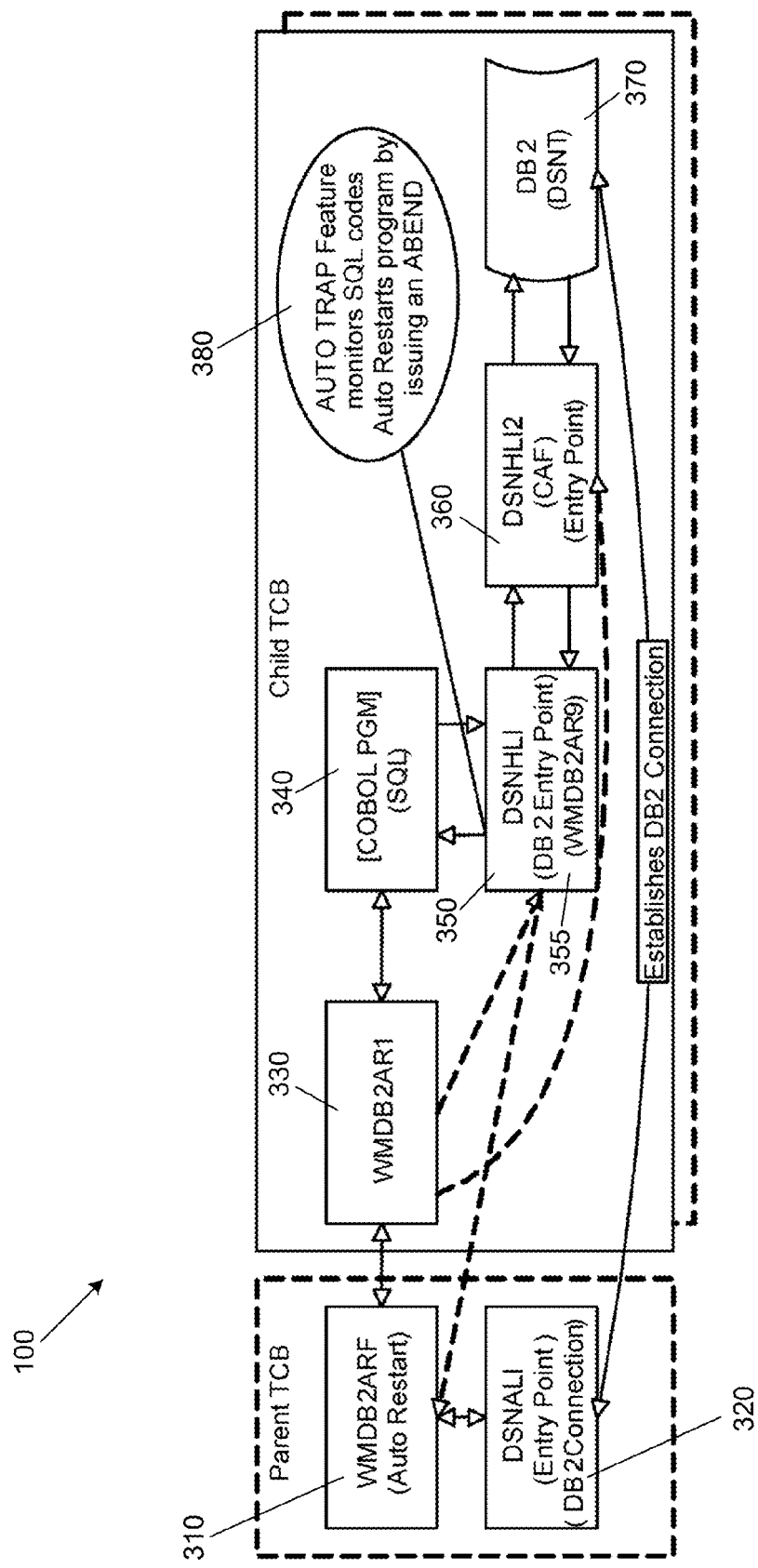
FIG. 3 illustrates a flow diagram of an implementation of the auto-restart system, according to an exemplary embodiment of the present invention.

In some exemplary embodiments, the auto-restart system 100 can maintain a participation list or an exclusion list, which can be based on the last SQL code of the child processes. The task control block 120 can compare a child process's last SQL code with the participation, or exclusion list. If a participation list is used, the auto-restart system 100 can restart the child process 130 if the last SQL code is on the participation list, and can select not to restart the child process if the last SQL code is absent from the participation list. Alternatively, if an exclusion list is used, the task control block 120 can restart the child process unless the last SQL code of the child process appears on the exclusion list FIG. 3 illustrates a flow diagram of an implementation of the auto-restart system 100, according to an exemplary embodiment of the present invention. As shown in FIG. 3, an implementation of the auto-restart system can comprise various components of the task control block 120 and the child process 130. For example, and not limitation, the task control block 120 can include WMDB2ARF 310 and DSNALI 320, and the child process 130 can include WMDB2AR1 330, a COBOL program 340, DSNHLI 350, and DSNHLI2 360. WMDB2ARF represents an auto-restart facility 310, which can provide some or all of the primary functionality for the auto-restart system 100.

An exemplary embodiment of the auto-restart system 100 can utilize DB2 370, an IBM-registered database management system 200, which can run on the z/OS platform. The auto-restart system 100, however, is not limited to the DB2 370 database management system 200, and other database management systems 200 can be used with appropriate implementation modifications. DSNALI 320 and DSNHLI2 360 are two modules supplied by IBM as part of a call attach facility ("CAF") 500 (see FIG. 5). DSNALI 320 can be the main application program interface ("API") used to connect to the DB2 370 database management system 200. DSNHLI2 360 can be the API used to make SQL calls to the DB2 370 database management system 200.

Figure 5:
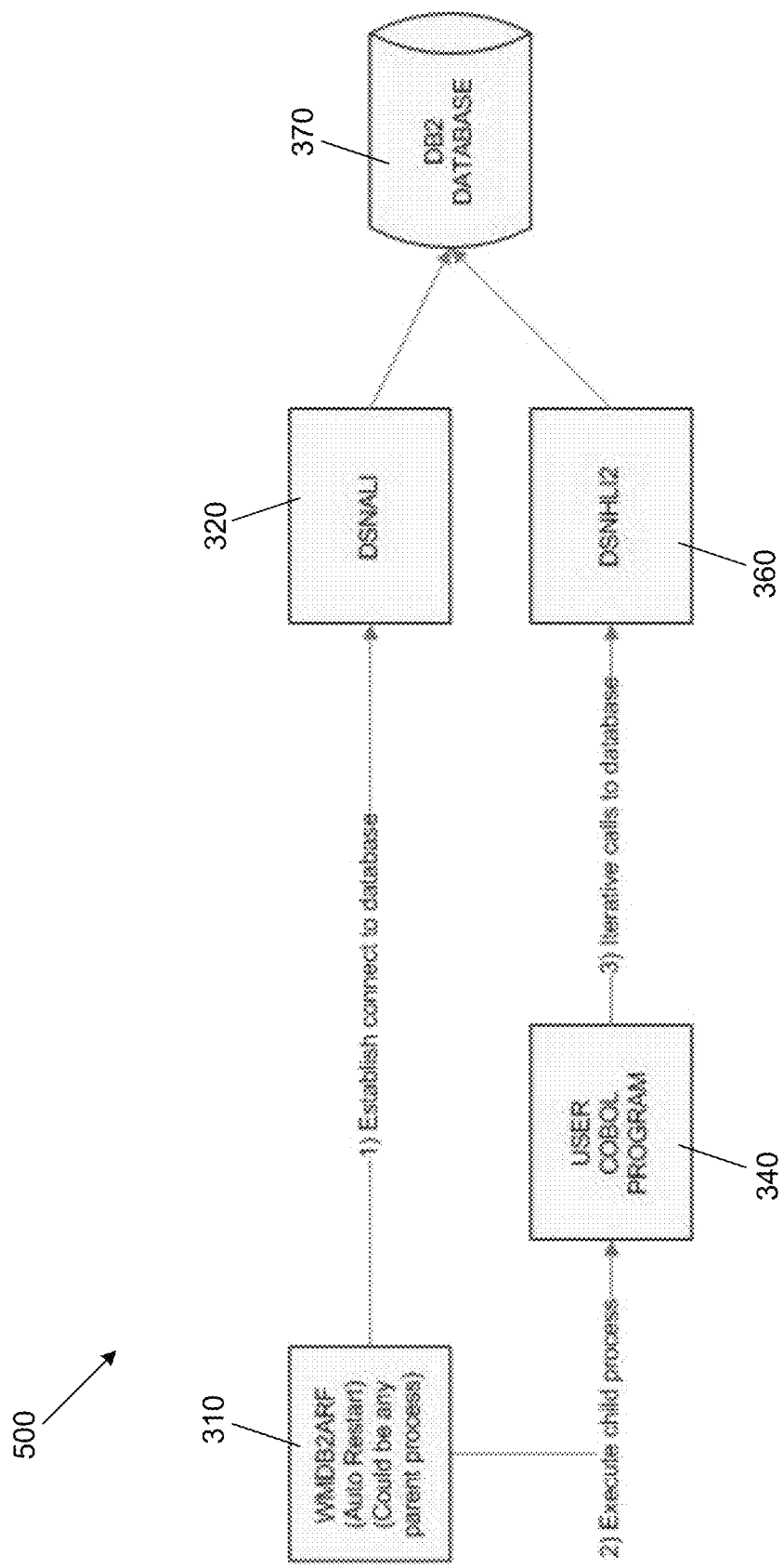
FIG. 5 illustrates an implementation of a call attach facility utilized in the auto-restart system, according to an exemplary embodiment of the present invention.

FIG. 5 illustrates a call attach facility 500, which can be utilized in an exemplary embodiment of the auto-restart system, 100. In a standard call attach facility 500 implementation, the child process 130 can make a direct call to DSNHLI2 360 to issue a DB2 370 database request, such as a SELECT, INSERT, UPDATE or DELETE request.

In a non-call attach facility environment using a DSN connection, the programs 340 executed by child processes 130 can be compiled to make direct calls to DSNHLI 350 to issue the DB2 370 database requests. The auto-restart system 100 can eliminate a need for job control language ("JCL") and child process 130 changes. Thus, the child processes 130 are compiled to make calls to the DSNHLI 350 API. The DSNHLI 350 can be a standard protocol to issue requests in the database management system 200 via the DSN system 610 provided by IBM.

Figure 6:
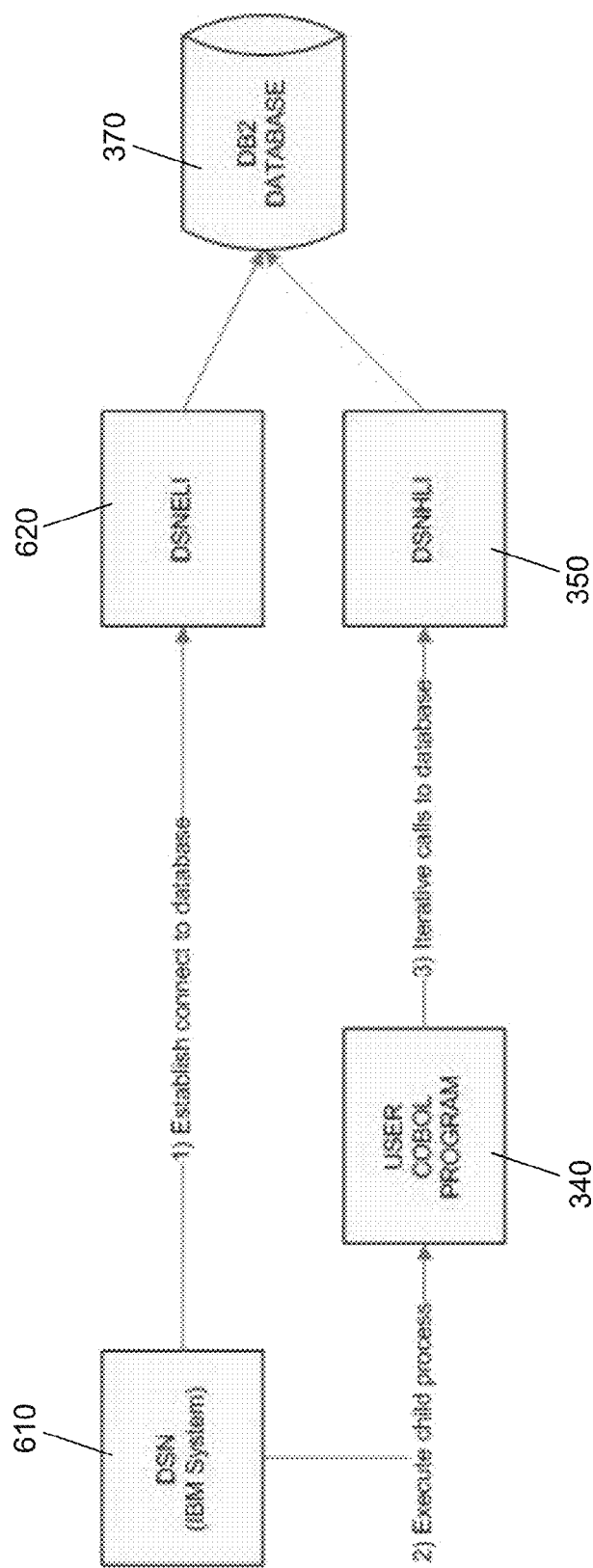
FIG. 6 illustrates a conventional use of an IBM DSN system, which can be adapted for use in the auto-restart system, according to an exemplary embodiment of the present invention.

FIG. 6 illustrates a conventional use of the DSN system 610, which can be adapted for use in an exemplary embodiment of the auto-restart system 100. The DSN system 610 can use IBM's DSNELI 620 main entry point to connect to the DB2 370 database management system 200. For more information refer to IBM's documentation on DSNELI 620, DSNALI 320, DSNHLI 350, and DSNHLI2 360.

Referring back to FIG. 3, in an exemplary embodiment of the auto-restart system 100, DSNHLI 350 can be the main entry point for the DB2 370 database management system 200 requests from the child processes 130, including compiled child processes 130 and system utilities. The DSNHLI 350 module need not be loaded into memory. Instead, DSNHLI 350 can be masked by a sub-routine WMDB2AR9 355 as part of the auto restart system 100. During initialization of the auto restart system 100, the load module WMDB2AR9 355 can be loaded into memory, and can be renamed to DSNHLI. The rename of WMDB2AR9 355 to DSNHLI need be only in memory in the current task control block 120 environment. As part of initialization, WMDB2AR9 355 can receive the address of DSNHLI2 360. As renamed to DSNHLI, WMDB2AR9 355 can become a pass-through mechanism called for DSNHLI 350 requests. WMDB2AR9 355 can pass control to DSNHLI2 360 to support the standard call attach facility 500 protocol.

WMDB2AR9 355 can receive a request from a child process 130 via a DSNHLI 350 call, and can pass the request forward to DSNHLI2 360 (IBM's call attach facility 500) to perform the DB2 370 database management system 200 operation. Upon return from DSNHLI2 360, WMDB2AR9 355 can save a SQLCA (IBM's SQL Communication Area) (not shown in the figures) control block in the auto restart system 100 memory, and can then return control back to the child process 130. The SQLCA can contain the SQL code as returned from the DB2 370 database management system 200. By saving the SQLCA in the auto restart system 100 memory, the SQLCA can be used to evaluate the last SQL code from the DB2 370 database management system 200 when a child process 130 terminates with a non-zero value exit code.

WMDB2AR1 330 can open a connection to DB2 370, load the DSNHLI2 360 load module, load the WMDB2AR9 355 load module, rename WMDB2AR9 355 to DSNHLI 350, and call the requested child process 130 program. In other words, WMDB2AR1 330 can set up the DB2 370 database management system 200 environment for the child process 130 to communicate with the DB2 370 database management system 200.

In some exemplary embodiments, the auto restart system 100 can automatically terminate a child process 130 when the auto-restart system 100 detects a SQL code returned from DSNHLI2 360 that appears in the participation list. This feature varies from previously-described operation of WMDB2AR9 355, which can generally return control back to the child process 130 for evaluation of the SQL code.

Also shown in FIG. 3, the Auto Trap option 380 as can provide a means to allow the auto-restart system 100 to detect the SQL codes, check the SQL code participation list, and then terminate the child process 130 if the SQL code appears in the participation list. When the Auto Trap feature 380 is active and an SQL code in the participation list is detected, the auto-restart system 100, specifically WMDB2AR9, can terminate the child process 130 with a user abend of U0102. In that case, control need not be returned to the child process 130. The user abend can terminate the child process 130, and thus, the task control block 120 can detect the termination and issue a restart on the child process 130.

Figure 4:
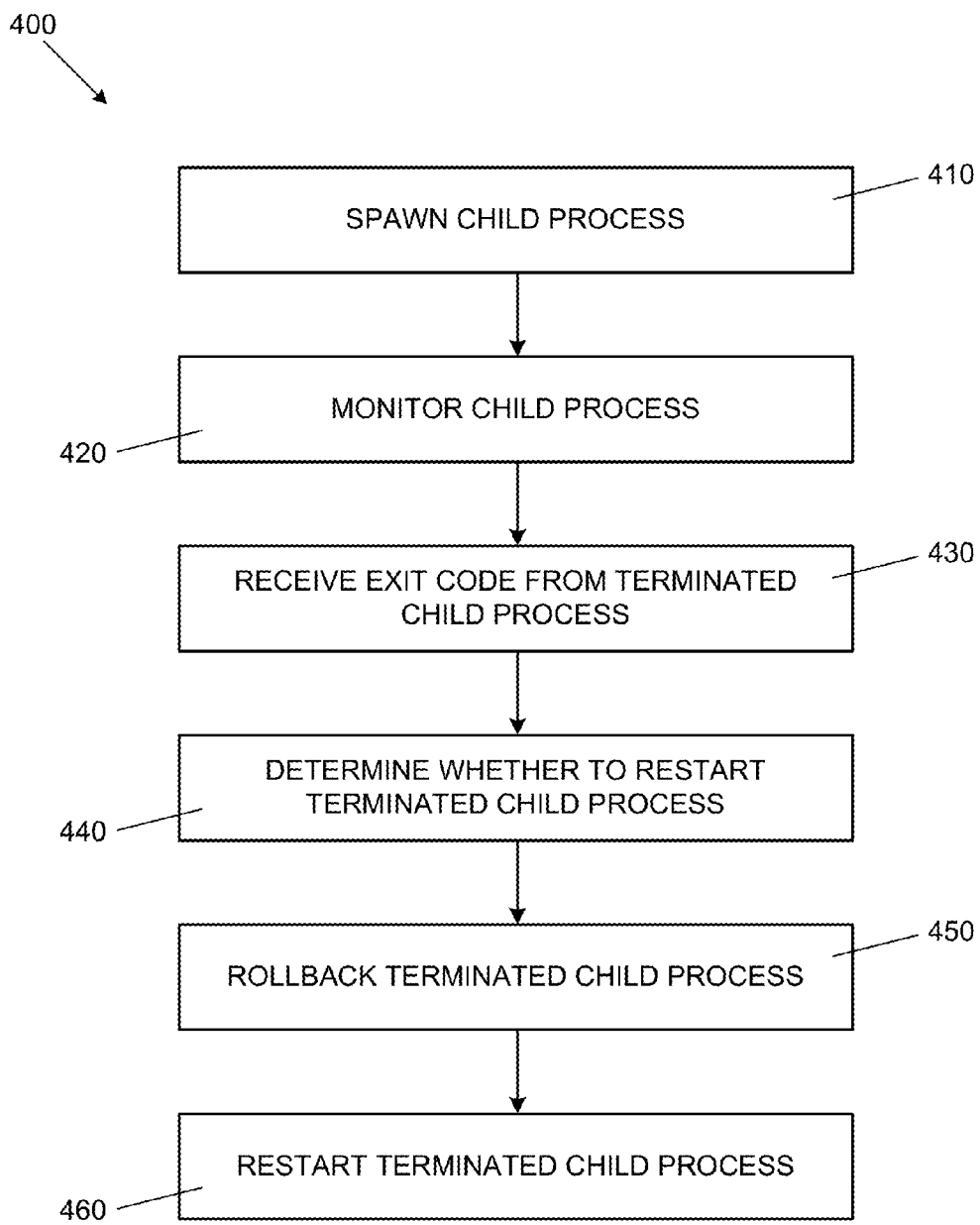
FIG. 4 illustrates a flow diagram of an auto-restart method, according to an exemplary embodiment of the present invention.

FIG. 4 illustrates a flow diagram of a method 400 of the task control block 120 for auto-restarting a child process 130 in an exemplary embodiment of the auto-restart system 100. As shown in FIG. 4, the task control block 120 can spawn a child process 130 at 410. The child process 130 can provide various functionalities of the database management system 200. At 420, the task control block 120 can monitor the spawned child process 130. If the child process 130 terminates abnormally, such as by a database contention error, the child process 130 can output an exit code indicating the abnormal termination. The task control block 120 can receive the exit code and detect termination of the child process 130 at 430. At 440, the task control block 120 can analyze the exit code and the SQL code of the child process 130 to determine whether to restart the child process 130. If it is determined that the child process 130 should be restarted, at 450, the task control block 120 can rollback the child process 130 to a checkpoint. At 460, the task control block 120 can automatically restart the child process 130. Accordingly, the child process 130 can continue executing the tasks assigned to it for operation of the database management system 200.

Exemplary Implementation

Embodiments of the auto-restart system 100 can be implemented in various manners. For example, and not limitation, aspects of the auto-restart system 100 can be implemented through one or more COBOL programs. In that case, primary functionality of the auto-restart system 100 can be controlled via global and local parameter files, which are also known as parm files. Additionally, COBOL programs, or other types of program for operations of the database management system 100 can be child processes 130 initiated by the task control block 120.

The auto-restart system 100 can display error information when child processes 130 terminate, and can issue rollbacks through an exit sub-routine based on checkpoints. The checkpoints can, but need not, be created by a standard checkpoint utility. The auto-restart system 100 can also display the SQL statements that were being executed by the terminated child processes 130, as well as any variables in use by the SQL statements. Upon request, or by default, the auto-restart facility can additionally display actual SQL counts used by terminated processes 130.

The task control block 120 of the auto-restart system 100 can detect standard exit codes of child processes 130. For example, in an exemplary embodiment, the task control block 120 can detect the four main exit points for a COBOL program: GOBACK, STOP RUN, USER ABEND, and SYSTEM ABEND. The task control block 120 can evaluate the exit type and last SQL error code and, based on this information, can determine whether and how to rollback and restart the child process 130. Because the auto-restart system 100 can recognize standard exit codes, no modifications to individual programs need be necessary to run such programs through the auto-restart system 100.

An exemplary embodiment of the auto-restart system 100 can, but need not, utilize one or more copybooks for implementing automatic restarts. For example, and not limitation, a copybook can be used to retrieve execution parameters.

For illustrative purposes only, exemplary copybook fields are provided below. In the provided exemplary copybook fields, the abbreviation "ARF" stands for auto-restart facility, and refers to a field related to the auto-restart system 100. An exemplary embodiment of the auto-restart system 100 can include the following copybook fields:

In an exemplary embodiment of the auto-restart system 100, at least a portion of the functionality of the auto-restart system 100 can be determined by the parm files. Separate parm files can be provided for global values and local values of variables. The global values can be designed to apply to the most common usages of the auto-restart system 100. When these variables are defined in the global parm file, they can represent default values for the auto-restart system 100. In contrast, when these variables are defined in the local parm file, they can override the values in the global parm file, and can apply only to programs running locally.

| Copybook Field | Description |
| --- | --- |
| :ARF:-RETURN-CODE | Internal variable used to pass return code values between the utility subroutines. |
| :ARF:-VERSION | Internal variable used to mark the version of the copybook. |
| :ARF:-DB2-PROGRAM-NAME | Name of a program to execute as a child process, which can be called by WMDB2AR1. |
| :ARF:-PROGRAM-SEQ | Internal variable used to indicate which program sequence is being executed. If a multi-threading mechanism is provided, this field can allow the calling program to determine in which thread sequence it is running. This variable can be set to 1 when the multi-threaded feature is not implemented. |
| :ARF:-THREAD-ID | Internal variable containing the task control block address. Used to detect exit method and exit codes. |
| :ARF:-THREAD-ECB | Internal variable representing address of Event Control Block ("ECB") for a called program (i.e., child process). An ECB is used to wait on the child process. When the child process terminates, the operating system posts or triggers this ECB, and control is returned to the task control block. |
| :ARF:-COMPLETION-IND | Internal variable used by auto-restart system to communicate the exit type for the called program. |
| :ARF:-SQL-COUNT-IND | Yes/No flag used to print SQL counts upon completion of the called program. |
| :ARF:-CHECKPOINT-RECORDS | Number of records to be used for checkpoints. |
| :ARF:-CHECKPOINT-TIME | Amount of time between check points. |
| :ARF:-JCL-PARM-LEN | Length of the data passed to the called program. This is primarily used by the utility to pass data to the called program. The called program can either use these fields or set up a standard linkage section definition and receive data on a procedure division statement. |
| :ARF:-JCL-PARM-DATA | Data passed to the called program. This variable can be used by the auto-restart system to pass data to the called program. The called program can either use these fields or setup the standard linkage section definition and receive the data on the procedure division statement. |
| :ARF:-EXECUTION-COUNT | Represents the number of times to execute the called program in a multi-threaded application. This variable can be set to 1 when the multi-threaded feature is not implemented. |
| :ARF:-DUMP-COLUMN-IND | Yes/No flag indicating to dump the columns of the last SQL statement if there was an error. |
| :ARF:-ROLLBACK-TYPE-IND | This instructs the utility on how to perform rollbacks. This variable can be used if a child process exits with GOBACK. |
| :ARF:-MONITOR-SQLCODES | A list of up to fifty SQL codes to be monitored for SQL contention abends. The array also contains the number of times to retry before terminating a child process, and the length of time to wait between each retry. |
| :ARF:-AUTO-TRAP-IND | Yes/No flag sets up the auto trap feature of the utility. This option can reduce the code in each program that checks for contention SQL codes. With this variable, the auto-restart utility can trap contention codes and automatically rollback and restart the program. |
| :ARF:-ABEND-ERROR-IND | Yes/No flag used to control the exit type of the task control block. |
| :ARF:-IGNORE-BAD-SQL-IND | Yes/No flag to tell the auto-restart system whether to evaluate the last BAD SQL code. Processing the last BAD SQL code can detect if a contention abend occurred prior to the last SQL statement, which could mean that a rollback is desirable. |
| :ARF:-DSNHLI-ADDRESSES | Internally used set of fields to communicate with the database interface. |
| :ARF:-GOBACK-NORMAL-EXIT | Internally used variable representing an address to store the exit code of the child process. |
| :ARF:-AUTO-RESTART-IND | Internally used variable to indicate whether the called program is being restarted. |
| :ARF:-EXCLUDE-PROGRAM-IND | Yes/No flag set when the called program is excluded from the auto-restart system, such as when found in one of the EXCLUDE-PROGRAM keywords in a parm file. When a program is not excluded, the auto-restart system 100 can evaluate SQL codes and attempt program restarts. |

In an exemplary embodiment, some or all of the keywords that accept a "yes" or "no" value can also accept y, true, t, on or 1 for "yes" values, and n, false, f, off or 0 for "no" values.

Values for the following variables can be defined in the parm files:

| Parm File Field | Description |
| --- | --- |
| CHECKPOINT-RECORDS | Number of records or limit for check point record process. |
| CHECKPOINT-TIME | Defines the amount of time between checkpoints. |
| MONITOR-SQLCODES | Identifies one or more SQL codes to consider for contention, or other resource unavailability, to evaluate for auto-restarts. This keyword can be entered multiple times to define each of the SQL codes to monitor. |
| SHOW-SQL-COUNTS | Yes/No value determines whether to display the SQL counts at the end of successful completion of a called program. |
| DUMP-COLUMNS | Yes/No value to request the auto-restart system to dump the SQL statement, any associated host variables, and any values of those variables if a called program fails with an unexpected SQL code. |
| ROLLBACK-FORMAT | This specifies how the ARF utility will perform rollbacks. |
| AUTO-TRAP-SQLCODES | Yes/No flag sets the auto-trap functionality. When this is activated, the monitored SQL codes can be evaluated after every SQL statement. When a monitored code is detected, the called program can be terminated with a user abend, and control is not returned to the called program. The user abend can force an automatic rollback of the current transaction. The auto-restart system can then restart the called program. |
| ABEND-ON-ERROR | Yes/No flag determines how the auto-restart system will exit on non-zero return codes. The global setting can be NO. A value of YES can abend the current step and process the error disposition option for all files. |
| IGNORE-BAD-SQL | Yes/No flag determines whether auto-restart system evaluates the last bad SQL code. The last bad SQL code could be the last SQL statement executed or could be from a past call.
When this is set to NO, the auto-restart system can evaluate only the last bad SQL code when a rollback is issued by the called program. This option is useful with programs that handle their own rollbacks. If some programs auto-correct their own errors and continue processing, it may not be desirable for the auto-restart system to attempt to rollback and restart these programs. |
| EXCLUDE-PROGRAM | This keyword expects a program name for a program to be excluded from the auto-restart system. |

Conclusion

The above implementation is provided for illustrative purposes only, and does not limit the scope of embodiments of the auto-restart systems 100. Various other implementations could be used to employ an exemplary embodiment of the system 100.

Accordingly, as described above, exemplary embodiments of the auto-restart system 100 and method can be used to monitor database processes, and to restart such processes after they terminate abnormally.

While embodiments of the auto-restart systems and methods have been disclosed in some exemplary forms, it will be apparent to those skilled in the art that many modifications, additions, and deletions can be made without departing from the spirit and scope of the auto-restart systems, methods, and their equivalents, as set forth in the following claims.

The invention claimed is:

1. A process management system, comprising:
a first parent task control block running in a database management system;
a computer processor for executing operations of the first parent task control block;
a first child process, spawned by the first parent task control block, comprising a first set of instructions in the database management system, wherein the first child process outputs an exit code and terminates upon encountering an unresolved database contention error while executing the first set of instructions; and
the first parent task control block being configured to:
detect the exit code,
determine an SQL code, among one or more SQL codes, that was returned by the first child process when it encountered the database contention error,
compare the SQL code to a list comprising a plurality of SQL codes,
determine whether to automatically restart the first child process based on a presence of the SQL code in the list comprising the plurality of SQL codes to resolve the database contention error, and
determine a time period for waiting before the first child process is automatically restarted, wherein the time period is determined based on the SQL code that was returned by the first child process when it encountered the database contention error.

2. The process management system of claim 1, the first parent task control block determining whether to roll back the first child process based on the exit code output by the first child process.

3. The process management system of claim 1, the first parent task control block rolling back the first child process to a checkpoint before restarting the first child process.

4. The process management system of claim 1, the first parent task control block being in a hung state until the first child process terminates.

5. The process management system of claim 1, further comprising a second child process for running a second set of instructions in the database management system.

6. The process management system of claim 5, the second child process being spawned by a second parent task control block.

7. The process management system of claim 5, the second child process locking a shared resource required for the first child process to execute the first set of instructions, thereby causing the database contention error.

8. The process management system of claim 1, further comprising restarting the first child process in response to a determination that the SQL code is present in the list and maintaining a termination of the first child process in response to a determination that the SQL code is not present in the list.

9. A process management system, comprising:
a plurality of parent processes running in a database management system, including a first parent process and a second parent process;
a computer processor for initializing the plurality of parent processes;
a plurality of child processes, including a first child process spawned by the first parent process, and a second child process spawned by the second parent process;
a shared resource accessible by each of the plurality of child processes, the shared resource being locked by the first child process;
the second child process, encountering an unresolved database contention error upon attempting to access the locked shared resource and, upon encountering the unresolved database contention error, outputting an exit code and terminating;
the second parent process detecting the exit code and termination of the second child process, and automatically restarting the second child process based on whether an SQL code that was returned by the second child process at the time of the unresolved database contention error appears on a predetermined list comprising a plurality of SQL codes; and
the second parent process determining a time period for waiting before the first child process is automatically restarted by the second parent process, wherein the time period is determined based on the SQL code that was returned by the second child process at the time of the unresolved database contention error.

10. The process management system of claim 9, the shared resource being a database record.

11. The process management system of claim 9, the second parent process determining how to restart the second child process based at least partially on the SQL code.

12. The process management system of claim 9, the second parent process determining when to restart the second child process based at least partially on the exit code.

13. The process management system of claim 9, wherein the predetermined list is an exclusion list, and the second parent process opts not to restart the second child process if the SQL code of the second child process is on the exclusion list.

14. The process management system of claim 9, wherein the predetermined list is a participation list, and wherein the second parent process automatically restarts the second child process if the SQL code of the second child process is on the participation list.

15. The process management system of claim 9, the second child process waiting for the shared resource for a predetermined time period before being terminated.

16. The process management system of claim 9, the second child process checking availability of the shared resource a predetermined number of times before being terminated.

17. The process management system of claim 9, the second child process being rolled back to a checkpoint.

18. A non-transitory computer-readable medium having encoded thereon one or more computer-executable instructions for effectuating a method for managing processes, the method comprising:
providing a plurality of parent task control blocks;
configuring each of the plurality of parent task control blocks to initialize a corresponding child process for executing a first set of instructions;
outputting an exit code and terminating a first child process corresponding to a first parent task control block in response to the first child process encountering an unresolved database contention error;
detecting, by the first parent task control block, the exit code output by the first child process;
determining an SQL code that was returned by the first child process when the abnormal termination was detected;
determining whether to restart the first child process automatically based on whether the SQL code that was returned by the first child process when the abnormal termination was detected is present on a predetermined list comprising a plurality of SQL codes; and
determining a time period for waiting before the first child process is automatically restarted, wherein the time period is determined based on the SQL code that was returned by the first child process when the first child process encountered the unresolved database contention error.

19. The non-transitory computer-readable medium of claim 18, the method further comprising configuring the first parent task control block to restart the first child process automatically.

20. The non-transitory computer-readable medium of claim 19, the method further comprising configuring the first parent task control block to roll back the first child process to a checkpoint before restarting the first child process.

21. The non-transitory computer-readable medium of claim 18, the method further comprising configuring the first parent task control block to compare the SQL code against a participation list to determine whether to restart the first child process.

22. The non-transitory computer-readable medium of claim 18, the first child process executing the a first set of instructions in a database management system.

* * * * *